(No Model.)
A. BOWN.
IMPLEMENT FOR CRIMPING SHELLS.
No. 318,412. Patented May 19, 1885.
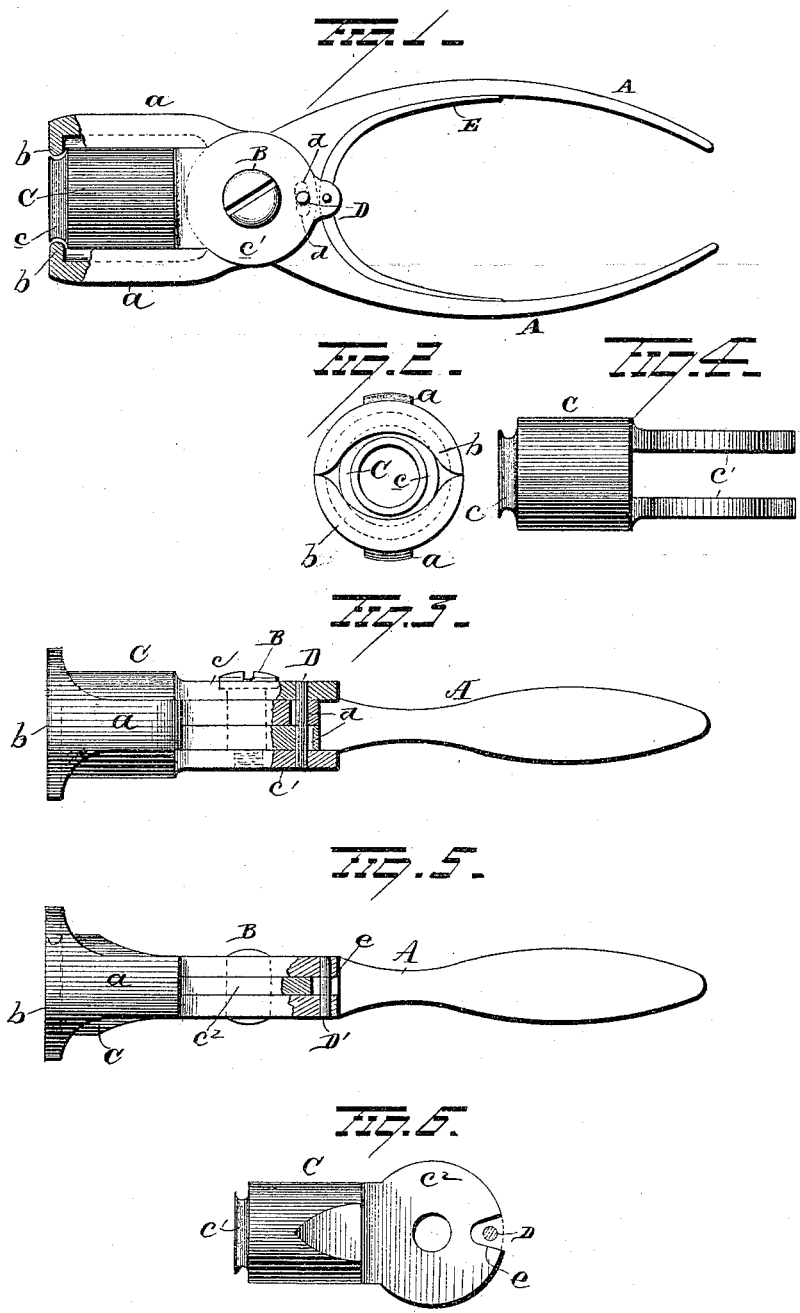

UNITED STATES PATENT OFFICE.

ALBERT BOWN, OF STREATOR, ILLINOIS, ASSIGNOR OF ONE-HALF TO FAWCETT PLUMB, OF SAME PLACE.

IMPLEMENT FOR CRIMPING SHELLS.

SPECIFICATION forming part of Letters Patent No. 318,412, dated May 19, 1885.

Application filed January 27, 1885. (No model.)

*To all whom it may concern:*

Be it known that I, ALBERT BOWN, of Streator, in the county of La Salle and State of Illinois, have invented certain new and useful Improvements in Implements for Crimping Shells; and I do hereby declare the following to be a full, clear, and exact description of the invention, such as will enable others skilled in the art to which it appertains to make and use the same.

My invention relates to an improvement in implements for crimping cartridges, the object of the same being to provide an implement for producing a crease in paper shields immediately above the wad which lies on the shot, and adapted to form the crease without any liability of tearing or roughing the surface of the paper, a further object being to provide an implement which shall be convenient, durable, and inexpensive; and with these ends in view my invention consists in a pair of levers pivoted together in the form of pinchers provided with inwardly-inclined curved lips, and a plug pivoted on the bolt connecting the levers and extending forward between the jaws.

My invention further consists in a plug extending forward between the jaws and adapted to be centered by the opening of the jaws.

My invention further consists in certain features of construction and combinations of parts, as will be hereinafter described, and pointed out in the claims.

In the accompanying drawings, Figure 1 is a view of the implement, partly in section. Fig. 2 is a front view; Fig. 3, a view in partly horizontal section, and Fig. 4 a detached view of the plug. Figs. 5 and 6 represent a modification.

The general appearance of the implement is that of a pair of pinchers. It consists of two levers, A, recessed at points a short distance from the gripping ends, and perforated to receive a pivotal bolt, B, by means of which the levers are united in a manner similar to that commonly employed in uniting the blades of scissors, nippers, pinchers, &c. The jaws $a$ preferably extend nearly or quite parallel with each other when in closed adjustment, and are provided at their ends with lips $b$, which project toward each other, and are shaped in the form of a semi-elliptical curve, the shape of figure formed by the faces of the lips when closed being an ellipse with sharp ends. The edges of the lips are rounded. The distance between the jaws $a$, when closed, is sufficient to admit a shell of the caliber desired, the faces or edges of the lips $b$ being somewhat nearer together when closed than the diameter of the shell.

Between the jaws $a$ is located a cylindrical plug, C, adapted to fit easily within the shell. The plug C is pivoted on the pivotal bolt B, and is provided with a curved shoulder, $c$, at its front end, the extreme front end of the plug being flush with the front surface of the lips $b$. The shouldered portion of the plug C is in the nature of a rounded groove cut into the edge of the circular end, thereby reducing the diameter of the extreme front end. The plug extends rearwardly in the form of a fork, the branches $c'$ embracing the opposite sides of the joint and receiving the pivotal bolt B. The branches $c'$ are also connected by a pin or bolt, D, which passes through the levers A a short distance to the rear of the bolt B.

The pin D is set firmly in the branches $c'$, but is allowed a play in the perforations $d$, formed in the levers, the said perforations $d$ being slightly elongated, so that when the jaws are open the pin $d$ will be acted upon in opposite directions by the two levers, and the plug C thereby centered between the jaws.

A spring, E, preferably of the flat form shown, is secured between the long ends or handles of the levers A, to keep them in a normally open adjustment. The spring is conveniently secured between the rear ends of the branches $c'$.

In the place of the two branches $c'$ the plug C may be reduced and extend rearwardly in a single central projection, $c^2$. (Shown in Figs. 5 and 6.) In this case the projection $c^2$ is pivoted between the levers A on the bolt B, and the levers A are each provided with a short pin, D′, set rigidly therein and projecting a short distance into a V-shaped slot, $e$, formed in the rear end of the projection $c^2$. Thus when the jaws are open the projecting ends of the pins D′ engage the opposite sides of the slot $e$, and serve to center the plug C in a manner similar to that explained above.

To use the implement, insert the plug C in the end of the shell until its forward end rests in contact with the wad. Then press the jaws together and give the implement a slight turn. The result will be a slight depression on the outside of the shell and a corresponding annular projection immediately above the wad on the inside, which will effectually prevent the wad from working loose.

The elliptical form of curve on the face of the lips admits of the jaws being compressed with great ease, and the gradual recession of the edges of the lips to the right and left of the central or more depressed portion of the lips admits of the implement being easily turned, and prevents any tendency to cut or rough the outside of the shell.

I am aware that it is old to use pinchers with projecting lips to crease a shell, and that pinchers provided with a laterally-projecting plug and means for centering the same have hitherto been constructed; hence I do not claim the same, broadly; but, Having fully described my invention, what I claim as new, and desire to secure by Letters Patent, is—

1. The combination, with a pair of levers hinged together in the form of pinchers and provided with inwardly-projecting curved lips, of a plug located between the jaws, and secured on the pivotal bolt of the levers, and pins passing through one or both of the levers and the rear end of the plug, whereby the plug is centered when the levers are opened, substantially as set forth.

2. In a shell-crimping implement, the combination, with a pair of levers hinged together in the form of pinchers, and provided with the inwardly-projecting crimping-lips, and a spring for holding the levers in open adjustment, of a plug located between the jaws and connected to the levers at two points, whereby it is held against movement when the jaws are in open adjustment.

3. In a shell-crimping implement, the combination, with a pair of lever-jaws provided with crimping-lips, of a plug adapted to fit within the shell, said plug being secured on the pivotal bolt of the lever-jaws and provided with a pin passing through elongated perforations in the levers, whereby the levers, when open, bear in opposite directions on the pin, and thereby center the plug, substantially as set forth.

In testimony whereof I have signed this specification in the presence of two subscribing witnesses.

ALBERT BOWN.

Witnesses:
GEORGE GOULDING,
JOHN E. WILLIAMS.